US012759445B2

(12) United States Patent
Mankame et al.

(10) Patent No.: US 12,759,445 B2
(45) Date of Patent: Oct. 13, 2026

(54) SEAT CUSHION MEMBER WITH LOCAL STRESS RELIEF FOR SITTING COMFORT

(71) Applicant: GM Global Technology Operations LLC, Detroit, MI (US)

(72) Inventors: Nilesh D. Mankame, Ann Arbor, MI (US); Wonhee Michael Kim, Troy, MI (US); Paul W. Alexander, Ypsilanti, MI (US); Paul E. Krajewski, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 219 days.

(21) Appl. No.: 18/421,075

(22) Filed: Jan. 24, 2024

(65) Prior Publication Data

US 2025/0236226 A1 Jul. 24, 2025

(51) Int. Cl.
*B60N 2/70* (2006.01)
*B60N 2/64* (2006.01)
*B60N 2/66* (2006.01)

(52) U.S. Cl.
CPC ............... *B60N 2/66* (2013.01); *B60N 2/646* (2013.01); *B60N 2/7035* (2013.01)

(58) Field of Classification Search
CPC ........ B60N 2/646; B60N 2/7035; A47C 7/18; A47C 7/029; A47C 27/142
See application file for complete search history.

(56) References Cited

U.S. PATENT DOCUMENTS 3,679,263 A * 7/1972 Cadiou .................... B60N 2/00 5/736
7,946,655 B2 * 5/2011 Hsu ...................... A47C 27/144 297/452.46
8,821,777 B2 * 9/2014 San Miguel ............ A47C 7/18 264/225
8,904,584 B2 * 12/2014 Sugano ................. B29D 22/00 5/652
9,038,221 B2 * 5/2015 Fraser ................. A61G 5/1043 5/654
9,211,827 B2 * 12/2015 Michalak ................ B60N 2/56
9,527,421 B2 * 12/2016 Hulway ................... B60N 2/99
9,914,380 B2 * 3/2018 Hugues .................... B60N 2/70
10,624,419 B2 * 4/2020 Dahl .................... A43B 13/186
10,703,239 B2 * 7/2020 O'Hara .................... B60N 2/70
10,986,936 B2 * 4/2021 Dahl ...................... A61G 1/013
11,242,905 B2 * 2/2022 Dahl ...................... B65D 81/05
11,382,428 B2 * 7/2022 Proctor ............... A47C 27/065
(Continued)

FOREIGN PATENT DOCUMENTS

CN 112046364 A * 12/2020 ........... B60N 2/7029
CN 113974372 A * 1/2022 ............. A47C 27/05
(Continued)

*Primary Examiner* — Timothy J Brindley
(74) *Attorney, Agent, or Firm* — Vivacqua Crane, PLLC

(57) ABSTRACT

A seat cushion member for relieving local pressure concentrations of an occupant is provided. The seat cushion member includes a seat suspension, a backing foam layer disposed on the seat suspension, a feature layer disposed on the backing foam layer, a topper foam layer disposed on the feature layer, and a trim layer disposed on the topper foam layer. The feature layer has multiple features, and at least some of the multiple features undergo a limit point traversal when the seat cushion member is occupied.

18 Claims, 7 Drawing Sheets

(56) References Cited

U.S. PATENT DOCUMENTS

| | | | | |
|---|---|---|---|---|
| 11,839,308 | B2 * | 12/2023 | Ribicic | A47C 27/056 |
| 2006/0277685 | A1 * | 12/2006 | Foley | A47C 27/144 5/653 |
| 2009/0217457 | A1 * | 9/2009 | Graebe | A47C 7/029 5/653 |
| 2013/0326819 | A1 * | 12/2013 | Wyman | A47C 27/053 5/738 |
| 2016/0166076 | A1 * | 6/2016 | Mossbeck | A47C 27/066 297/452.5 |
| 2019/0008286 | A1 * | 1/2019 | Xia | B68G 7/05 |

FOREIGN PATENT DOCUMENTS

| | | | | | |
|---|---|---|---|---|---|
| CN | 116172364 | A | * | 5/2023 | A47C 27/15 |
| DE | 4130854 | A1 | | 4/1992 | |
| DE | 102005017470 | A1 | | 11/2005 | |
| DE | 102014004983 | A1 | | 10/2015 | |
| DE | 102019113342 | A1 | | 2/2020 | |
| GB | 2594476 | A | * | 11/2021 | A47G 9/10 |
| KR | 102481483 | B1 | * | 12/2022 | A47C 27/142 |

* cited by examiner

SEAT CUSHION MEMBER WITH LOCAL STRESS RELIEF FOR SITTING COMFORT

INTRODUCTION

The present disclosure relates to a seat for use in a vehicle, and, more particularly, a seat having a cushion member with localized stress relief for an occupant of a vehicle.

Some regions of a seat occupant's body, such as ischial tuberosities, support a significant part of occupant load when the occupant is seated. Other regions of the seat occupant's body, such as an underside of a knee, have blood vessels carrying blood to the lower legs located close to the skin. However, prolonged sitting can lead to discomfort caused by compression of tissue and blood vessels in the sensitive regions of an occupant.

Thus, while current vehicle seats achieve their intended purpose, there is a need for a new and improved vehicle seat having localized comfort.

SUMMARY

According to several aspects of the present disclosure, a seat cushion member for relieving local pressure concentrations of an occupant is provided. The seat cushion member includes a seat suspension, a backing foam layer disposed on the seat suspension, a feature layer disposed on the backing foam layer, a topper foam layer disposed on the feature layer, and a trim layer disposed on the topper foam layer. The feature layer has multiple features, and at least some of the multiple features undergo a limit point traversal when the seat cushion member is occupied.

In accordance with another aspect of the disclosure, the seat cushion member includes a backing foam layer having a plurality of dimples.

In accordance with another aspect of the disclosure, the seat cushion member includes a feature layer having a first feature layer and a second feature layer.

In accordance with another aspect of the disclosure, the seat cushion member includes multiple features that return to a nondisplaced configuration when a load is removed from at least a portion of the seat cushion member.

In accordance with another aspect of the disclosure, the seat cushion member includes multiple features that include a set of first features and a set of second features. The set of first features have a different limit point than the set of second features.

In accordance with another aspect of the disclosure, the seat cushion member includes multiple features that include shells with a circular or polygonal base.

In accordance with another aspect of the disclosure, the seat cushion member includes multiple features that are shells in the form of segments of tubes.

In accordance with another aspect of the disclosure, the seat cushion member includes multiple features that have a cross section that is circular.

In accordance with another aspect of the disclosure, the seat cushion member includes multiple features having a cross section that is polygonal. In accordance with another aspect of the disclosure, the seat cushion member is disposed in at least one of a seat cushion, a seat back, a head rest, a calf support, or an arm support.

In accordance with another aspect of the disclosure, the seat cushion member includes nondisplaced features that extend into the topper foam layer.

According to several aspects of the present disclosure, a seat in a vehicle for relieving local pressure concentrations of an occupant is provided. The seat includes at least one of a seat cushion or a seat back and a seat cushion member disposed within the cushion housing. The seat cushion member includes a seat suspension, a backing foam layer disposed on the seat suspension, a feature layer disposed on the backing foam layer, a topper foam layer disposed on the feature layer, and a trim layer disposed on the topper foam layer. The feature layer has multiple features and at least some of the multiple features undergo a limit point traversal when the seat cushion member is occupied.

In accordance with another aspect of the disclosure, the seat includes a feature layer having a first feature layer and a second feature layer.

In accordance with another aspect of the disclosure, the seat includes a backing foam layer that includes a plurality of dimples. The features correspond with the plurality of dimples, and nondisplaced features of the feature layer extend into the topper foam layer.

In accordance with another aspect of the disclosure, the seat includes multiple features having a set of first features and a set of second features. The set of first features has a different limit point than the set of second features.

In accordance with another aspect of the disclosure, the seat includes multiple features that are shells with a circular or polygonal base.

In accordance with another aspect of the disclosure, the seat includes multiple features that are shells in the form of segments of tubes.

According to several aspects of the present disclosure, a seat in a vehicle for relieving local pressure concentrations of an occupant is provided. The seat includes a seat cushion and a seat cushion member disposed within the cushion housing. The seat cushion includes a cushion housing for receiving the occupant, and the cushion housing has an exterior surface for receiving the occupant. The cushion housing is arranged to be deformable and sealable. The seat cushion member includes a seat suspension, a backing foam layer disposed on the seat suspension, a feature layer disposed on the backing foam layer, a topper foam layer disposed on the feature layer, and a trim layer disposed on the topper foam layer. The backing foam layer includes a plurality of dimples. The feature layer has a set of first features and a set of second features, and the first features and the second features correspond with the plurality of dimples. At least some of the first features and the second features are configured to undergo a limit point traversal when the seat cushion member is occupied. Nondisplaced features extend into the topper foam layer.

In accordance with another aspect of the disclosure, the seat includes the feature layer with third features having a different limit point than the first features and the second features.

In accordance with another aspect of the disclosure, the seat includes first features and second features that are shells with a circular or polygonal base.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When a component, element or layer is referred to as being "on", "engaged to", "connected to", or "coupled to" another element or layer, it may be directly on, engaged, connected or coupled to the other component, element, or layer, or intervening elements or layers may be present. In contrast, when an element is referred to as being "directly on", "directly engaged to", "directly connected to", or "directly coupled to" another element or layer, there may be in intervening elements or layers present. Other words used to describe the relationship between elements should be interpreted in a like fashion, such as "between" versus "directly between", "adjacent" versus "directly adjacent", and the like. As used herein, the term "and/or" includes any and all combinations of one or more of the associated listed items.

Figure 1:
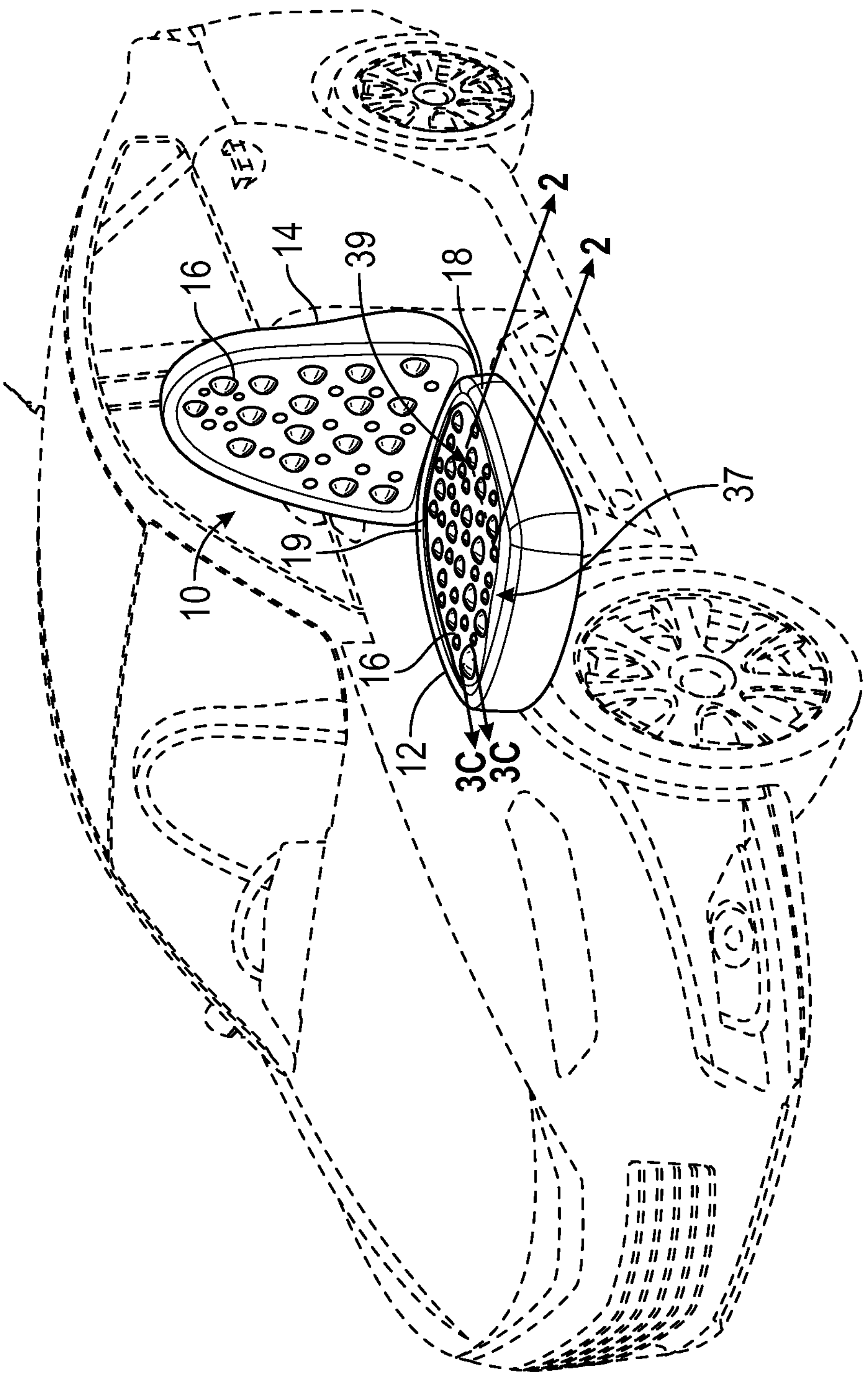
FIG. 1 is a perspective view of a vehicle seat including a seat cushion member having a feature layer with domed features for localized stress relief for an occupant in an exemplary vehicle, in accordance with the present disclosure.

FIG. 1 is a perspective view illustrating a vehicle seat 10 in an exemplary vehicle 11. The vehicle seat 10 includes a seat cushion 12 and a seat back 14, and a seat cushion member 16 for relieving local pressure concentrations of an occupant in accordance with one aspect of the present disclosure. As shown, the vehicle seat 10 is utilized in a vehicle, such as a passenger road vehicle, nautical vehicles, such as a boat, or aeronautical vehicles, such as drones or passenger airplanes, and the like. It should be appreciated that the vehicle seat 10 may be utilized in other applications, for example furniture seating, such as a couch or outdoor chair. The vehicle seat 10 may additionally include a calf support, a head rest, arm supports, and the like (not particularly shown), which are configured for receiving an occupant. The seat cushion 12 and/or the seat back 14 includes a cushion housing 18 arranged to be deformable and sealable. The cushion housing 18 includes an interior (not shown) for containing the seat cushion member 16 and an exterior surface 19 for receiving the occupant.

Figure 2:
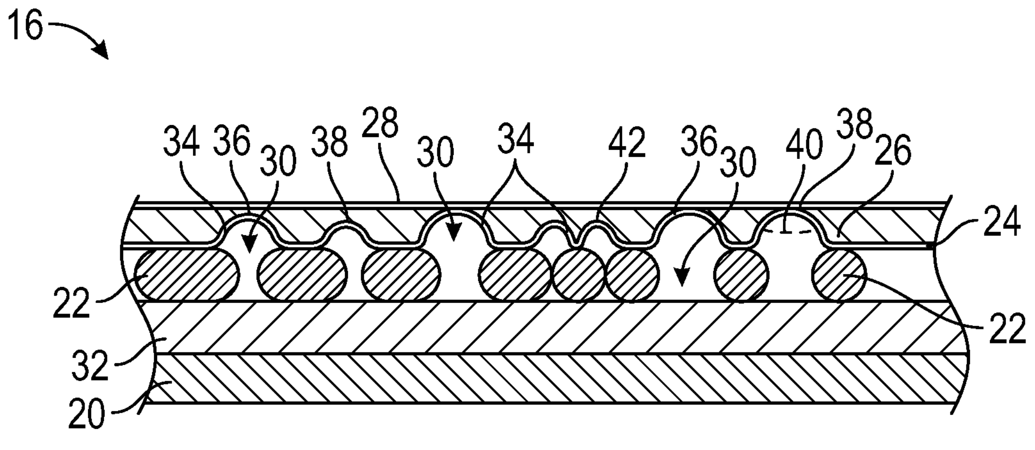
FIG. 2 is a cross section side view of the seat cushion member in the vehicle seat shown in FIG. 1, in accordance with the present disclosure.

FIG. 2 is a cross section view along lines 2-2 in FIG. 1 illustrating a cut away depiction of the seat cushion member 16. The seat cushion member 16 is configured to improve occupant comfort by relieving local pressure concentrations and redistributing to occupant load over a wider support area. The seat cushion member 16 is disposed within the cushion housing 18 of the seat cushion 12, the seat back 14, the calf supports, the head rest, and/or the arm supports. The seat cushion member 16 includes a seat suspension 20, a backing foam layer 22, a feature layer 24, and a topper foam layer 26.

The seat suspension 20 is operatively coupled to the seat structure. The seat suspension 20 may include a metal or plastic seat frame and springs for providing cushioning.

FIG. 2 illustrates the backing foam layer 22 of member 16 disposed on an optional intermediate element 32 which is supported by the seat suspension 20. The backing foam layer 22 includes a layer of foam for providing support and suspension. The backing foam layer 22 can be formed of any material that is compressible and supports an occupant of the vehicle seat 10, for example polyurethane foam. Additionally, the backing foam layer 22 may include a plurality of dimples 30. The dimples 30 include indentations or spaces within the backing foam layer 22. The dimples 30 may extend partially into or completely through the backing foam layer 22. In some instances, the backing foam layer 22 may not include dimples 30.

As shown in FIG. 2, an optional intermediate element 32 may be disposed between the backing foam layer 22 and the seat suspension 20. This may take the form of another foam layer, an elastomer mat, a semi-flexible plastic mat, etc. When the intermediate element 32 is utilized, it provides an additional layer of support and cushion for an occupant.

Referring to FIG. 2, the feature layer 24 is disposed on the backing foam layer 22 or the optional intermediate element 32 when the intermediate element 32 is included. The feature layer 24 includes multiple features 34 that provide passive structural elements that undergo a limit point traversal, which provides relief of pressure concentrations to an occupant and improves long-term comfort. Each feature 34 corresponds with one of the plurality of dimples 30 such that when a feature 34 is deformed, for example by an occupant of the vehicle seat 10, the resulting deformed feature 34 extends and/or is pressed into and at least partially fills a corresponding dimple 30. The multiple features 34 are mono-stable and therefore do not maintain their deformed position once the elastic limit point traversal has been passed.

Referring to FIGS. 1 and 2, the feature layer 24 includes a set of first features 36 and a set of second features 38. The first features 36 have first characteristics, for example a first threshold point. The first threshold point is an elastic force limit that, when exceeded, changes the load-displacement relationship for features 36. The second features 38 have second characteristics, for example a second threshold point. The second threshold point is an elastic force limit that, when exceeded, changes the load-displacement relationship for features 38. In a preferred embodiment, the first threshold and the second threshold are different, thereby providing two sets of deformation or displacement levels. Additionally, the first features 36 can be a different size (e.g., radius, thickness, pitch, height, and so forth) than the second features 38. For example, the first features 36 can be larger in height and radius than the second features 38. The features 34 may be arranged symmetrically (e.g., a first row of first features 36, a second row of second features 38, a third row of first features 36, and so forth) or may be arranged asymmetrically (e.g., randomly). The features 36 and 38 can be arranged in groups that target specific regions of interaction with the occupant (e.g. features 36 might be arranged in the part of the seat that is likely to interact with the ischial tuberosities of the occupant whereas features 38 might be disposed in the region that is likely to support the underside of the knees).

The features 34 of the feature layer 24 are designed to have predetermined limit point thresholds and a specific mechanical performance. In an aspect, the features 34 may have a crease 40 extending at least partially around a portion of the feature 34 to facilitate a specific limit point threshold and/or a non-axisymmetric displacement. In another aspect, the features 34 might have one or more perforations. Parameters that influence the limit point threshold and mechanical properties may include material, thickness, radius, height, unit spacing, crease location during displacement, crease size, perforation patterns, and/or perforation density.

The feature layer 24 may be formed of a variety of materials according to a desired limit point threshold or mechanical property. For example, the feature layer 24 may include polymers, elastomers (e.g., neoprene, isoprene, vulcanized rubber, ethylene propylene diene monomer (EPDM) rubber, silicone rubber, and the like), thermoplastics (e.g., high-density polyethylene (HDPE), low-density polyethylene (LDPE), polyethylene (PE), polyurethane (PU), and the like), thermosets, polyolefins, polyethylene, polypropylene, polystyrene, polyvinyl chloride, polyvinylidene chloride, polyvinyl acetate, acrylic polymers, polyacrylonitrile, polymethyl methacrylate, or any other suitable materials without departing from the spirit or scope of the present disclosure.

In an aspect of the disclosure, the feature layer 24 may include third features 42 with third characteristics. For example, the third features 42 may be smaller or a different size than the first features 36 and the second features 38. Additionally, the third features 42 may have a different limit point and/or mechanical property than the first features 36 and the second features 38. It should be appreciated that the feature layer 24 can include additional sets of features (e.g., fourth features, fifth features, and so forth).

Figure 3A:
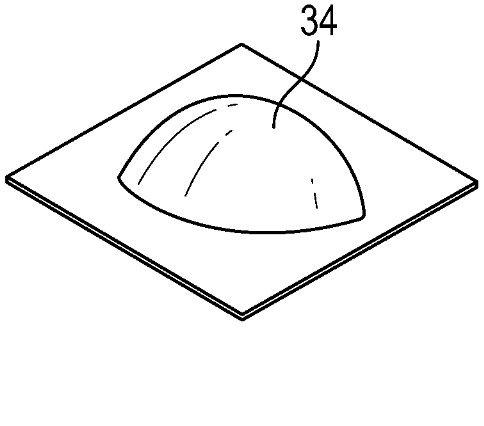
FIG. 3A is a perspective view of a nondisplaced feature of the feature layer included in the seat cushion member shown in FIG. 2, in accordance with the present disclosure.
Figure 3B:
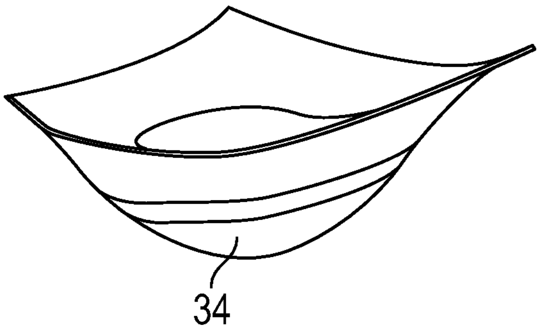
FIG. 3B is a perspective view of a displaced feature of the feature layer included in the seat cushion member shown in FIG. 2, in accordance with the present disclosure.

FIGS. 3A-3B illustrate one feature 34 in a dome configuration. The feature 34 with the dome configuration has a circular cross section and/or a circular or polygonal base. Use of a feature 34 with a polygonal base may reduce a number of snapping modes and may allow more precise control over the limit point threshold because a polygon has a lower symmetry than a circle. In FIG. 3A, the feature 34 is shown in an original or nondisplaced configuration before an occupant occupies the vehicle seat 10. In FIG. 3B, the feature 34 is shown in a displaced configuration when an occupant occupies the vehicle seat 10 and force from the occupant exceeds the limit point threshold of the feature.

Figure 3C:
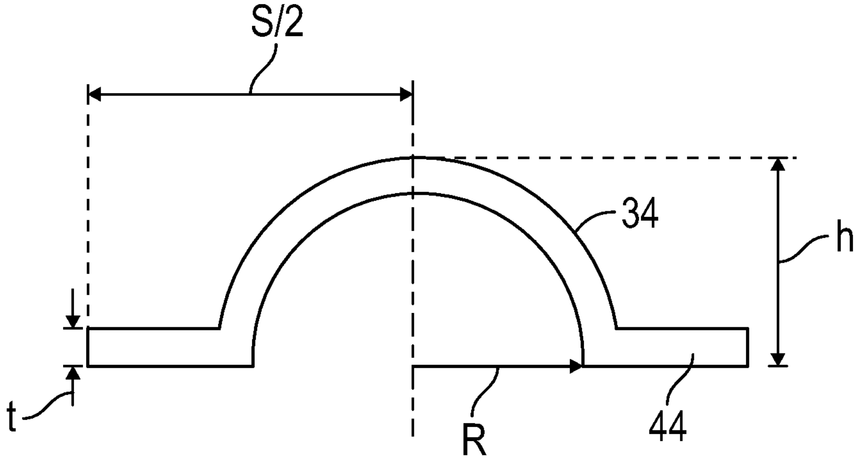
FIG. 3C is a cross section side view of a feature of the feature layer included in the seat cushion member shown in FIG. 2, in accordance with the present disclosure.

FIG. 3C illustrates a cross section along lines 3C-3C in FIG. 1 of the feature 34 in a dome configuration illustrated in FIGS. 3A and 3B. The feature 34 is a dome connected to a flat region 44 of the feature layer 24 and has a thickness t, a height h, a base radius R, and a distance S between feature centers, which are predetermined to achieve certain mechanical characteristics and a specified limit point threshold. The feature 34 has a shallowness ratio SH=h/R and slenderness ratio SL=h/t. Additionally, the feature 34 has pattern spacing at mesoscale and can be quantified by distance S between neighboring feature centers and expressed as a packing ratio PK=S/R. In one aspect, the feature 34 illustrated in FIG. 3 has a base radius R of 8 millimeters (mm), a shallowness ratio SH of 0.6, and a slenderness ratio SL of 10. In another aspect, the feature 34 illustrated in FIG. 3 has a base radius R of 8 mm, a shallowness ratio SH of 0.75, a slenderness ratio SL of 10, and a packing ratio PK of 3. It should be appreciated that the feature 34 can include other configurations and dimensions.

Figure 4:
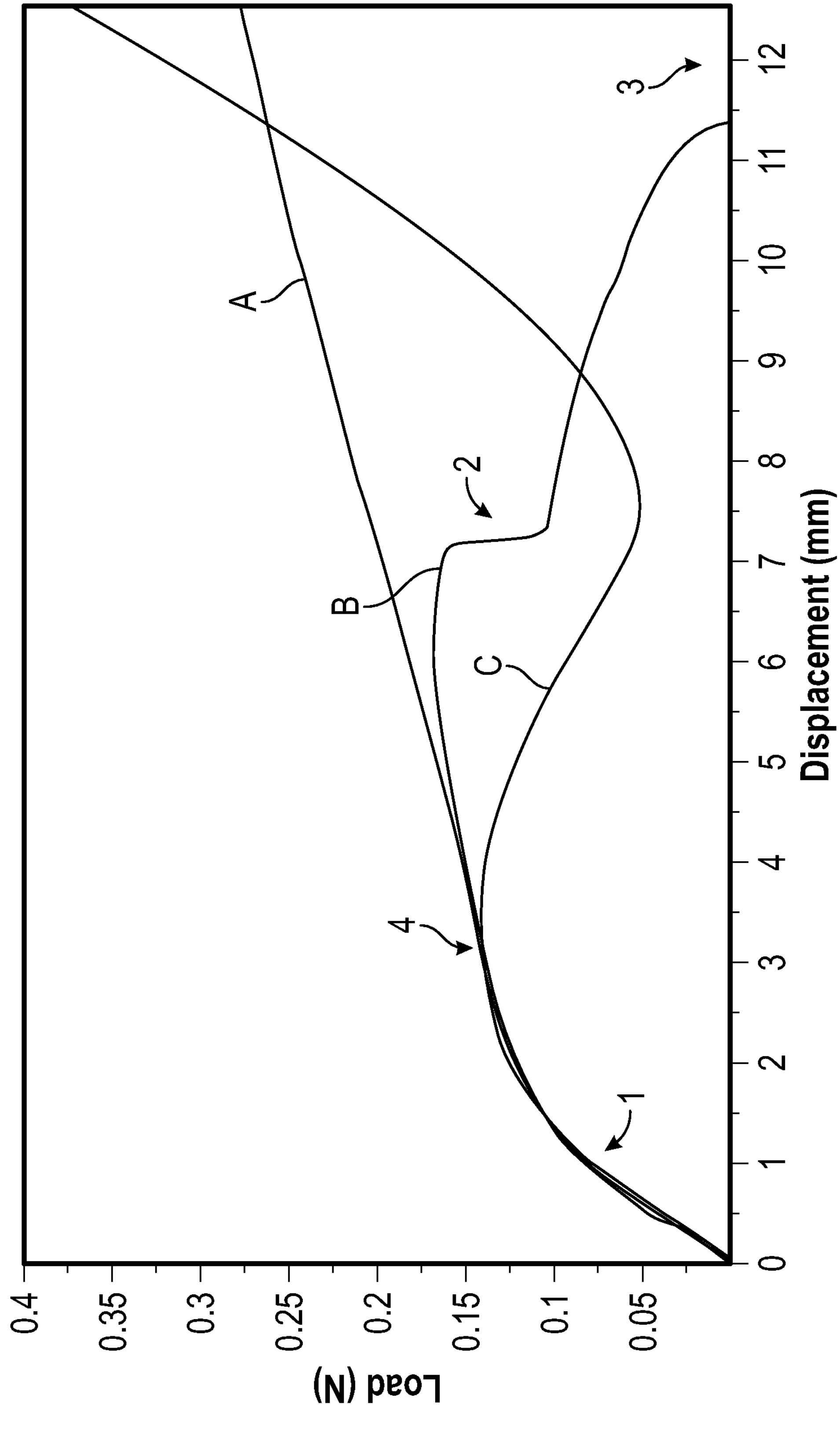
FIG. 4 is a graphical representation of the load-displacement response of several features, as illustrated in FIG. 2, with different designs exhibiting a limit point response, in accordance with the present disclosure.

Referring to FIG. 4, the features 34 undergo a limit point traversal when the seat cushion member 16 is occupied. Each feature 34 has two stable states and exhibits a limit point in its mechanical response to an applied force (e.g., newtons (N)), for example caused by a seat occupant. At point 1, each feature has a positive stiffness but the applied load is below the limit point threshold. As the feature 34 whose load-displacement relationship is represented by line A experiences a load increase, displacement of the feature 34 is progressive and gradual. However, the load-displacement relationship undergoes a significant change at the limit point threshold denoted by point 4. The reduction in stiffness of the feature for loads greater than those corresponding to point 4 reduces the load carrying ability of this feature for these loads. The parts of the occupant's body that are supported by such a feature will see their load increase at a slower rate compared to neighboring regions that are supported by conventional seat foam once the threshold force value for the feature is exceeded. The features 34 represented by line A may gradually and progressively return to a non-displaced state after any load is removed.

Line B illustrated in FIG. 4 represents a feature 34 configured for rapid loading, for example during a submarining event. In this configuration, the feature 34 exhibits an initial load-displacement response that is similar to the one represented by Curve A, where the stiffness of the feature reduces significantly at the limit point denoted by 4. However, the feature whose response is represented by curve B exhibits another limit point. This corresponds to the sudden drop in load in the regime denoted by 2. The sudden drop in load followed by a large deformation under negative stiffness leads to the displaced state (shown at point 3), which may be described as a "snap" or rapid displacement. The feature 34 represented by line B may rapidly return to a non-displaced state after any load is removed. In other instances, the feature represented by line B may be bi-stable, and, after displacement, the feature 34 may require an additional force to return to a non-displaced state, for example using pressurized air. The sudden drop in the supported load and large subsequent displacement that is triggered by the load exceeding the second limit point threshold can be used to mitigate the submarining of an occupant during sudden deceleration events.

Line C illustrated in FIG. 4 represents a feature 34 that exhibits a positive stiffness until the limit point (shown at point 4) is reached. For loads higher than the limit point load, the feature 34 exhibits a negative stiffness until a minimum force level is reached for a positive value of the supported load. If the feature 34 continues to be loaded beyond this point, it again exhibits a positive stiffness. The feature 34 represented by line C may rapidly return to a non-displaced state after any load is removed. The negative stiffness of the feature 34 represented by line C results in load shedding by the feature 34 in this regime of its operation. This load shedding results in a drop in the local pressure of the regions of the occupant's body that are supported by this feature 34. The load that is shed by these features 34 gets redistributed to other parts of the occupant's body (e.g., the surrounding regions that are supported by conventional seat foam). The spatial distribution of these features 34 in the seat is designed so that the load gets redistributed in a way that increases the overall comfort for the occupant.

A region 37 of the feature layer 24 may be adapted to mitigate risk of an occupant submarining during a sudden deceleration event. This can be done by arranging features 34 with a load-displacement relationship represented by point B in FIG. 4 in a specific region (e.g., region 37 shown in FIG. 1) of the seat cushion member 16. Region 37, which may extend from about 50 millimeters (mm) fore of a H-point (or hip-point) to about 150 mm fore of the H-point. The features 34 are configured so that during normal operation of the vehicle, load exerted by the occupant on the feature 34 does not reach a level of the second limit point threshold. However, during sudden deceleration event, high inertia forces acting on the occupant cause the load exerted by the occupant on the features 34 to exceed the second limit point threshold. A resulting sudden drop in the supported load and a large deflection of the feature layer 24 causes the occupant to sink into the seat and have their forward motion restrained by the seat structure instead of sliding forward under the seatbelt.

Figure 5:
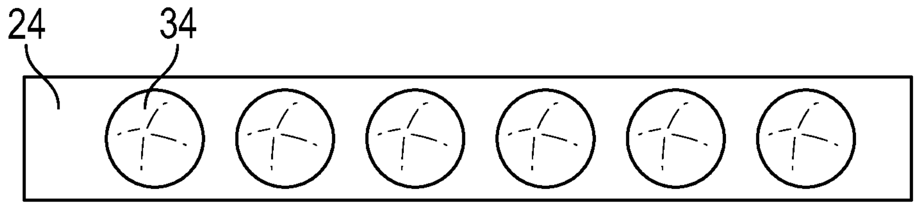
FIG. 5 is a perspective view of the feature layer illustrated in FIG. 2 having features in a one-dimensional configuration, in accordance with the present disclosure.
Figure 6:
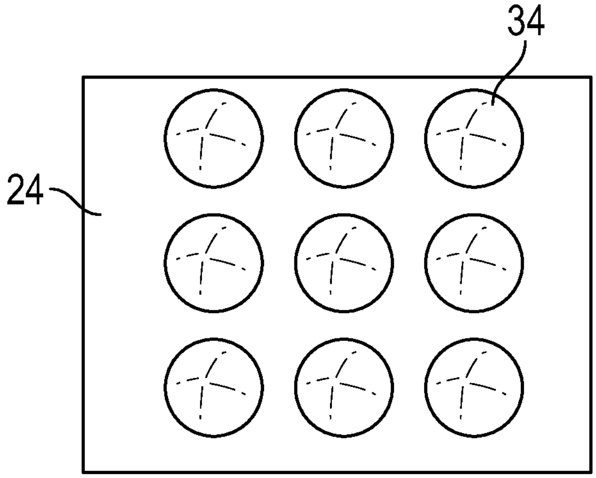
FIG. 6 is a perspective view of the feature layer illustrated in FIG. 2 having features in a two-dimensional configuration, in accordance with the present disclosure.

Referring to the example illustrated in FIG. 5, the features 34 may be arranged in a one-dimensional configuration (e.g., a line, a 6×1 grid) on the feature layer 24. Referring to the example illustrated in FIG. 6, the features 34 may be arranged in a two-dimensional configuration (e.g., a 3×3 grid) on the feature layer 24. It should be understood that the features 34 can be arranged in other one- and two-dimensional arrangements (e.g., a 1×10 grid, a 1×20 grid, a 2×10 grid, a 15×15 grid, and so forth).

Figure 7:
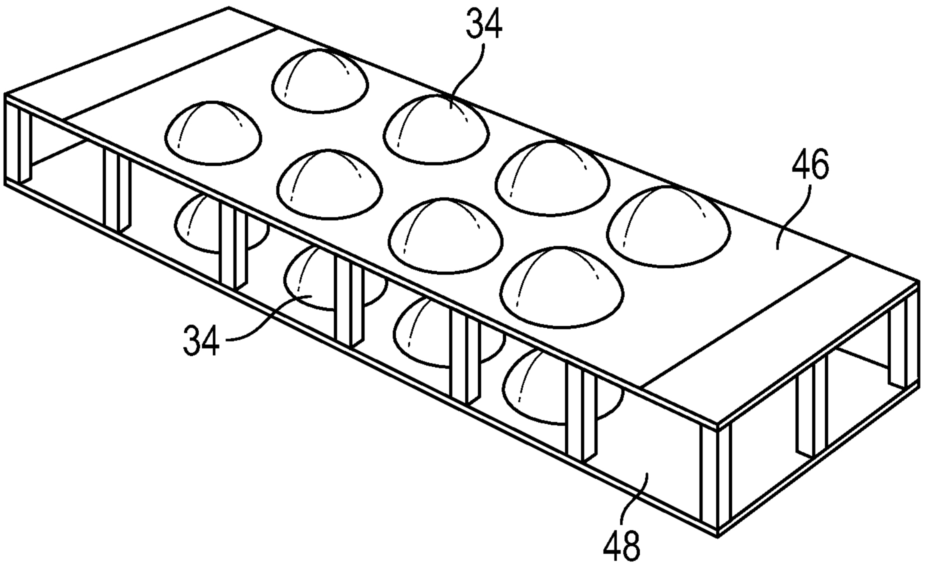
FIG. 7 is a perspective view of the feature layer illustrated in FIG. 2 having a first feature layer and a second feature layer, in accordance with the present disclosure.

Referring to FIG. 7, a first feature layer 46 may be positioned adjacent and parallel to a second feature layer 48. The first feature layer 46 and the second feature layer 48 are both shown with multiple features 34 in a 4×2 grid. However, the features 34 of the first feature layer 46 and the second feature layer 48 can include any number of arrangements and may include a set of first features 36, a set of second features 38, and so forth. The first feature layer 46 and the second feature layer 48 may or may not be coupled together and may be separated by air, by foam, or by some other material.

Referring again to FIG. 2, the topper foam layer 26 is disposed on the feature layer 24. The topper foam layer 26 is a layer of foam that provides an initial layer of support and cushion to the occupant of the vehicle seat 10. The foam can be formed of a variety of materials, for example a polymer. The topper foam layer 26 is arranged so that when the features 34 are in an undeformed or nondisplaced state, the features 34 extend into the topper foam layer 26, and the topper foam layer 26 is formed at least partially surrounding a surface of the feature layer 24 and the features 34. In some instances, the topper foam layer 26 is not formed surrounding the surface of the feature layer 24 and the features 34.

FIG. 2 illustrates the trim layer 28 disposed on the topper foam layer 26. The trim layer 28 provides an exterior layer of protection to the seat cushion member 16 and/or the seat cushion member 16. In some aspects, the trim layer 28 can also be a portion of or the same as the cushion housing 18. The trim layer 28 can be formed of a variety of materials, for example a polymer such as silicone or polypropylene or a natural vulcanized rubber.

Figure 8:
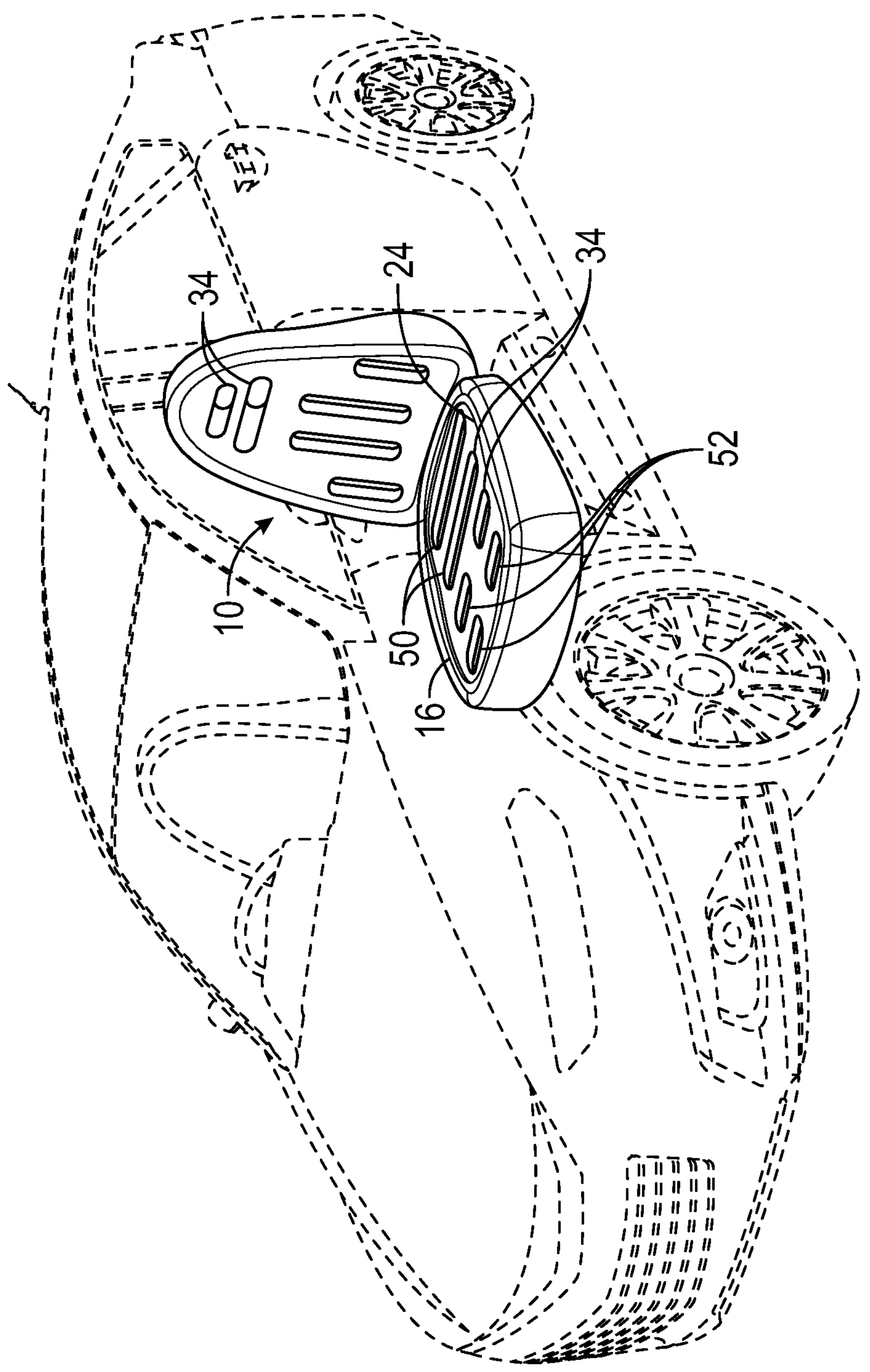
FIG. 8 is a perspective view of a vehicle seat including a seat cushion member having a feature layer with half-cylindrical features for localized stress relief for an occupant, in accordance with the present disclosure.

FIG. 8 is a cut away view of the vehicle seat 10 with a seat cushion member 16 including a feature layer 24 with features 34 configured in a half-cylinder arrangement or shells in the form of segments of tubes. In this arrangement, the features 34 are half or partial cylinders that extend along at least a portion of the feature layer 24. The half cylinder features 34 may be different sizes (e.g., radius, thickness, height, and so forth) and may be different lengths. When the features 34 are half-cylinders, the features 34 may have closed ends, open ends, or a combination thereof.

As shown in FIG. 8, the feature layer 24 includes a first set 50 of half-cylinder features 34 and a second set 52 of half-cylinder features 34. The first set 50 of half-cylinder features 34 have different mechanical properties than the second set 52 of half-cylinder features 34. For example, the first set 50 of half-cylinder features 34 can have a different height and thickness than the second set 52 of half-cylinder features 34. The first set 50 of half-cylinder features 34 and the second set 52 of half-cylinder features 34 may include other differing characteristics, (e.g., radius, distance between feature centers, and the like). Additionally, as illustrated in FIG. 8, a portion of the half-cylinder features 34 (e.g., first set of half-cylinder features 34) can be oriented differently (e.g., perpendicular) to another portion (e.g., the second set 52 of half-cylinder features 34) of the half-cylinder features 34.

Figure 9:
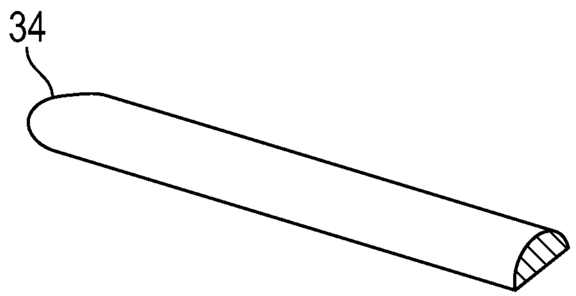
FIG. 9 is a perspective view illustrating one half-cylindrical feature with a half circle cross section of the feature layer and vehicle seat shown in FIG. 10, in accordance with the present disclosure.

Referring to FIG. 9, the half-cylinder feature 34 may have a half circle cross-section. In this example, the half-cylinder feature 34 may include a consistent radius or a varying radius (e.g., a first portion of the feature 34 with a first radius and a second portion of the feature 34 with a second radius).

Figure 10:
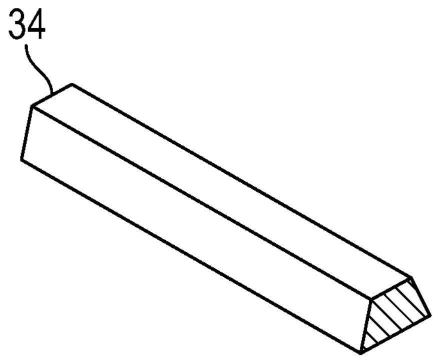
FIG. 10 is a perspective view illustrating one half-cylindrical feature with a trapezoid cross section of the feature layer and vehicle seat shown in FIG. 10, in accordance with the present disclosure.

FIG. 10 is a perspective view of a half-cylinder feature 34 with a trapezoid or polygon cross section. In the example illustrated in FIG. 10, the trapezoid cross section may extend a full length of the feature 34 or may be arranged in only a portion of the feature 34. It is contemplated that the half-cylinder feature 34 may include other cross section configurations, for example a square, a rectangle, a polygonal, arched, and/or an irregular pattern.

The vehicle seat 10 with the seat cushion member 16 including a feature layer 24 of the present disclosure offers several advantages. Some regions of an occupant's body (e.g., ischial tuberosities) support a significant portion of an occupant's load when the occupant is seated. Other regions (e.g., an underside of a knee) have blood vessels carrying blood to a lower part of the occupant's legs close to skin. Prolonged seating leads to discomfort caused by compression of tissue and blood vessels in sensitive regions of the occupant's body. The feature layer 24 is a passive structural element, where the features 34 undergo a limit point traversal that relieves pressure concentrations in these sensitive regions. The relieved pressure concentration provides long term comfort to the occupant. Additionally, the feature layer 24 facilitates a thinner seat instead of using additional cushioning, which would make a vehicle seat thicker and heavier.

What is claimed is:

1. A seat cushion member for relieving local pressure concentrations of an occupant, comprising:
- a seat suspension;
- a backing foam layer disposed on the seat suspension;
- a feature layer disposed on the backing foam layer, wherein the feature layer has multiple features, and wherein at least some of the multiple features undergo a limit point traversal when the seat cushion member is occupied;
- a topper foam layer disposed on the feature layer, wherein nondisplaced features extend into the topper foam layer; and
- a trim layer disposed on the topper foam layer.

2. The seat cushion member of claim 1, wherein the backing foam layer includes a plurality of dimples.

3. The seat cushion member of claim 1, wherein the feature layer includes a first feature layer and a second feature layer.

4. The seat cushion member of claim 1, wherein the multiple features return to a nondisplaced configuration when a load is removed from at least a portion of the seat cushion member.

5. The seat cushion member of claim 1, wherein the multiple features include a set of first features and a set of second features, wherein the set of first features have a different limit point than the set of second features.

6. The seat cushion member of claim 1, wherein the multiple features include shells with a circular or polygonal base.

7. The seat cushion member of claim 1, wherein the multiple features include shells in the form of segments of tubes.

8. The seat cushion member of claim 7, wherein the multiple features have a cross section that is circular.

9. The seat cushion member of claim 7, wherein the multiple features have a cross section that is polygonal.

10. The seat cushion member of claim 1, wherein the seat cushion member is disposed in at least one of a seat cushion, a seat back, a head rest, a calf support, or an arm support.

11. A seat in a vehicle for relieving local pressure concentrations of an occupant, comprising:
- at least one of a seat cushion or a seat back, the at least one of the seat cushion or the seat back including a cushion housing for receiving the occupant, wherein the cushion housing has an exterior surface for receiving the occupant, and wherein the cushion housing is arranged to be deformable and sealable; and
- a seat cushion member disposed within the cushion housing, the seat cushion member including:
- a seat suspension;
- a backing foam layer disposed on the seat suspension, wherein the backing foam layer includes a plurality of dimples;
- a feature layer disposed on the backing foam layer, wherein the feature layer has multiple features, and wherein at least some of the multiple features undergo a limit point traversal when the seat cushion member is occupied, wherein the features correspond with the plurality of dimples;
- a topper foam layer disposed on the feature layer, wherein nondisplaced features of the feature layer extend into the topper foam layer; and
- a trim layer disposed on the topper foam layer.

12. The seat of claim 11, wherein the feature layer includes a first feature layer and a second feature layer.

13. The seat of claim 11, wherein the multiple features includes a set of first features and a set of second features, wherein the set of first features has a different limit point than the set of second features.

14. The seat of claim 11, wherein the multiple features include shells with a circular or polygonal base.

15. The seat of claim 11, wherein the multiple features include shells in the form of segments of tubes.

16. A seat in a vehicle for relieving local pressure concentrations of an occupant, comprising:
- a seat cushion, the seat cushion including a cushion housing for receiving the occupant, wherein the cushion housing has an exterior surface for receiving the occupant, and wherein the cushion housing is arranged to be deformable and sealable; and
- a seat cushion member disposed within the cushion housing, the seat cushion member including:
- a seat suspension;
- a backing foam layer disposed on the seat suspension, the backing foam layer including a plurality of dimples;
- a feature layer disposed on the backing foam layer, wherein the feature layer has a set of first features and a set of second features, wherein the first features and the second features correspond with the plurality of dimples, and wherein at least some of the first features and the second features are configured to undergo a limit point traversal when the seat cushion member is occupied;
- a topper foam layer disposed on the feature layer, wherein nondisplaced features extend into the topper foam layer; and
- a trim layer disposed on the topper foam layer.

17. The seat of claim 16, wherein the feature layer includes third features having a different limit point than the first features and the second features.

18. The seat of claim 16, wherein the first features and the second features are shells with a circular or polygonal base.

* * * * *